(12) United States Patent
Krstić et al.

(10) Patent No.: US 8,473,961 B2
(45) Date of Patent: Jun. 25, 2013

(54) METHODS TO GENERATE SECURITY PROFILE FOR RESTRICTING RESOURCES USED BY A PROGRAM BASED ON ENTITLEMENTS OF THE PROGRAM

(75) Inventors: Ivan Krstić, Sunnyvale, CA (US); Austin G. Jennings, Santa Clara, CA (US); Richard L. Hagy, Montara, CA (US)

(73) Assignee: Apple Inc., Cupertino, CA (US)

( * ) Notice: Subject to any disclaimer, the term of this patent is extended or adjusted under 35 U.S.C. 154(b) by 243 days.

(21) Appl. No.: 13/007,472

(22) Filed: Jan. 14, 2011

(65) Prior Publication Data

US 2012/0185863 A1 Jul. 19, 2012

(51) Int. Cl.
| | |
|---|---|
| *G06F 17/00* | (2006.01) |
| *G06F 7/04* | (2006.01) |
| *G06F 15/16* | (2006.01) |
| *G06F 17/30* | (2006.01) |
| *G06F 9/46* | (2006.01) |

(52) U.S. Cl.
USPC .................................. 718/104; 726/1; 726/4

(58) Field of Classification Search
None
See application file for complete search history.

(56) References Cited

U.S. PATENT DOCUMENTS

| | | | |
|---|---|---|---|
| 6,044,367 A | 3/2000 | Wolff | |
| 6,535,867 B1 | 3/2003 | Waters | |
| 7,587,426 B2 | 9/2009 | Fujiwara et al. | |
| 7,673,137 B2 * | 3/2010 | Satterlee et al. | 713/164 |
| 7,770,174 B1 | 8/2010 | Martin et al. | |
| 2004/0133777 A1 | 7/2004 | Kiriansky et al. | |
| 2004/0194104 A1* | 9/2004 | Beresnevichiene et al. | 718/100 |
| 2006/0021029 A1 | 1/2006 | Brickell et al. | |
| 2006/0075464 A1 | 4/2006 | Golan et al. | |
| 2007/0136279 A1 | 6/2007 | Zhou et al. | |
| 2008/0127292 A1 | 5/2008 | Cooper et al. | |
| 2008/0184336 A1 | 7/2008 | Sarukkai et al. | |
| 2009/0150546 A1 | 6/2009 | Ryan | |
| 2009/0249071 A1* | 10/2009 | De Atley et al. | 713/171 |
| 2010/0312749 A1 | 12/2010 | Brahmadesam et al. | |
| 2011/0138174 A1 | 6/2011 | Aciicmez et al. | |
| 2011/0296515 A1* | 12/2011 | Krstic et al. | 726/10 |
| 2012/0185879 A1* | 7/2012 | Van Vechten et al. | 719/328 |

OTHER PUBLICATIONS

Hubbard, Jordan "Mac OS X—From the server room to your", Apple Inc., Nov. 17, 2008, downloaded from, 117 pages.

(Continued)

*Primary Examiner* — Meng-Ai An
*Assistant Examiner* — Bradley Teets
(74) *Attorney, Agent, or Firm* — Blakely, Sokoloff, Taylor & Zafman LLP (57) ABSTRACT

In response to a request for launching a program, a list of one or more application frameworks to be accessed by the program during execution of the program is determined. Zero or more entitlements representing one or more resources entitled by the program during the execution are determined. A set of one or more rules based on the entitlements of the program is obtained from at least one of the application frameworks. The set of one or more rules specifies one or more constraints of resources associated with the at least one application framework. A security profile is dynamically compiled for the program based on the set of one or more rules associated with the at least one application framework. The compiled security profile is used to restrict the program from accessing at least one resource of the at least one application frameworks during the execution of the program.

18 Claims, 5 Drawing Sheets

OTHER PUBLICATIONS

Mazzoleni, P. et al. "XACML Policy Integration Algorithms (Not to be confused with XACML Policy Combination Algorithms!)", SACMAT '06, Lake Tahoe, CA, Jun. 7-9, 2006, 9 pages.

Yee, Ka-Ping, "Secure Interaction Design and the Principle of Least Authority", CHI 2003, Fort Lauderdale, FL, Apr. 5-10, 2003, 4 pages.

* cited by examiner

METHODS TO GENERATE SECURITY PROFILE FOR RESTRICTING RESOURCES USED BY A PROGRAM BASED ON ENTITLEMENTS OF THE PROGRAM

FIELD OF THE INVENTION

Embodiments of the invention relate generally to the field of secure computing; and more particularly, to restricting resources used by a program based on its entitlements.

BACKGROUND

Security concerns for all types of processor-based electronic devices, and particularly for computing devices, have become significant. While some concerns may relate to detrimental actions which may be undertaken by defective code implemented by such devices, the greater concerns relate to the ramifications of various types of attacks made upon such devices through malicious code, including code conventionally known in the field by a number of names, such as "viruses", "worms", "Trojan horses", "spyware", "malware", and others. Such malicious code can have effects ranging from relatively benign, such as displaying messages on a screen, or taking control of limited functions of a device; to highly destructive, such as taking complete control of a device, running processes, transmitting and/or deleting files, etc. Virtually any type of imaginable action on a processor-based device has been the subject of attacks by malicious code.

Many of these attacks are directed at computing devices, such as workstations, servers, desktop computers, notebook and handheld computers, and other similar devices. Many of these computing devices can run one or more application programs which a user may operate to perform a set of desired functions. However, such attacks are not limited to such computing devices. A broader group of various types of devices, such as cell phones; personal digital assistants ("PDAs"); music and video players; network routers, switches or bridges; and other devices utilizing a microprocessor, micro-controller, or a digital signal processor, to execute coded instructions have been the subjects of attacks by malicious code.

A number of methodologies have been used in an attempt to reduce or eliminate both attacks and influence of malicious or defective code. Generally, these methodologies include detection, prevention, and mitigation. Specifically, these methodologies range from attempts to scan, identify, isolate, and possibly delete malicious code before it is introduced to the system or before it does harm (such as is the objective of anti-virus software, and the like), to restricting or containing the actions which may be taken by processes affected by malicious or defective code. However, such restrictions typically are configured statically based on a set of rules set forth in a security profile. Such statically configured rules do not always represent the dynamic conditions of an operating environment at runtime.

SUMMARY OF THE DESCRIPTION

According to one aspect of the invention, in response to a request for launching a program, a list of one or more application frameworks to be accessed by the program during execution of the program is determined. Zero or more entitlements representing one or more resources entitled by the program during the execution are determined. A set of one or more rules based on the entitlements of the program is obtained from at least one of the application frameworks. The set of one or more rules specifies one or more constraints of resources associated with the at least one application framework. A security profile is dynamically compiled for the program based on the set of one or more rules associated with the at least one application framework. The compiled security profile is used to restrict the program from accessing at least one resource of the at least one application frameworks during the execution of the program.

According to another aspect of the invention, in response to a request for launching a program, a list of resources to be accessed by the program during execution of the program is determined. A predetermined function of a library that provides access of the resources is invoked, including passing as a parameter one or more resource entitlements of the program, to obtain a set of rules for accessing resources associated with the library based on the resource entitlements. A security profile is dynamically generated for the program based on the set of rules, where the security profile is used to restrict the program from accessing other resources of the library that the program is not entitled during execution of the program.

Other features of the present invention will be apparent from the accompanying drawings and from the detailed description which follows.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, one or more entitlements are defined for each program or application that is to be deployed in a data processing system. The entitlements represent certain functions or resources that the program is entitled to access. The entitlements may be specified by a developer during development of the program or alternatively, entitlements can be specified by an authorization entity, such as authorization server or provisioning server, which provisions or distributes the program. Such entitlements may be specified as an attribute or metadata attached to or embedded within the program, and optionally signed by the authorization entity using a digital certificate.

Entitlements can then be used to generate a set of rules specifying certain actions or resources that a program can or cannot do or access during execution of the program. The set of rules are then dynamically compiled into a security profile for the program. During the execution of the program, the security profile is used to enforce the set of rules to restrict the program from performing any action or accessing any resource that the program is not entitled. This in effect forces or contains the program to operate in a restricted operating environment, also referred to as a sandbox or sandboxed environment. Restricting execution of a program within a restricted operating environment can reduce the changes of the program interfering or causing damages to other components or resources of an electronic device. For example, a program may be developed by a third party and downloaded from a network. The program may include a malfunctioning component or routine (e.g., programming bugs), which may accidentally access certain critical memory space that normally exclusively utilized by an operating system, microprocessor, bus, or other components of the electronic device. Such actions may cause the electronic device to crash. Alternatively, a program may be a malicious program that is developed to intentionally cause damages to an operating environment and/or electronic device. For example, a program with virus may be specifically developed to take control of the electronic device and/or steal confidential information of a user that operates the electronic device. By restricting the execution of a program within a restricted operating environment, such damages can be greatly reduced. With embodiments described through this application, it is easier for a developer or an administrator to specify and/or configure a proper restricted operating environment for a particular program. As a result, a developer does not need to know how to program or set up a set of rules for the purpose of generating a security profile (e.g., programming or scripting languages). Rather, the developer may only need to specify zero or more entitlements for a program using certain user-recognizable terms. Note that a program and an application are interchangeable terms throughout this application.

Figure 1:
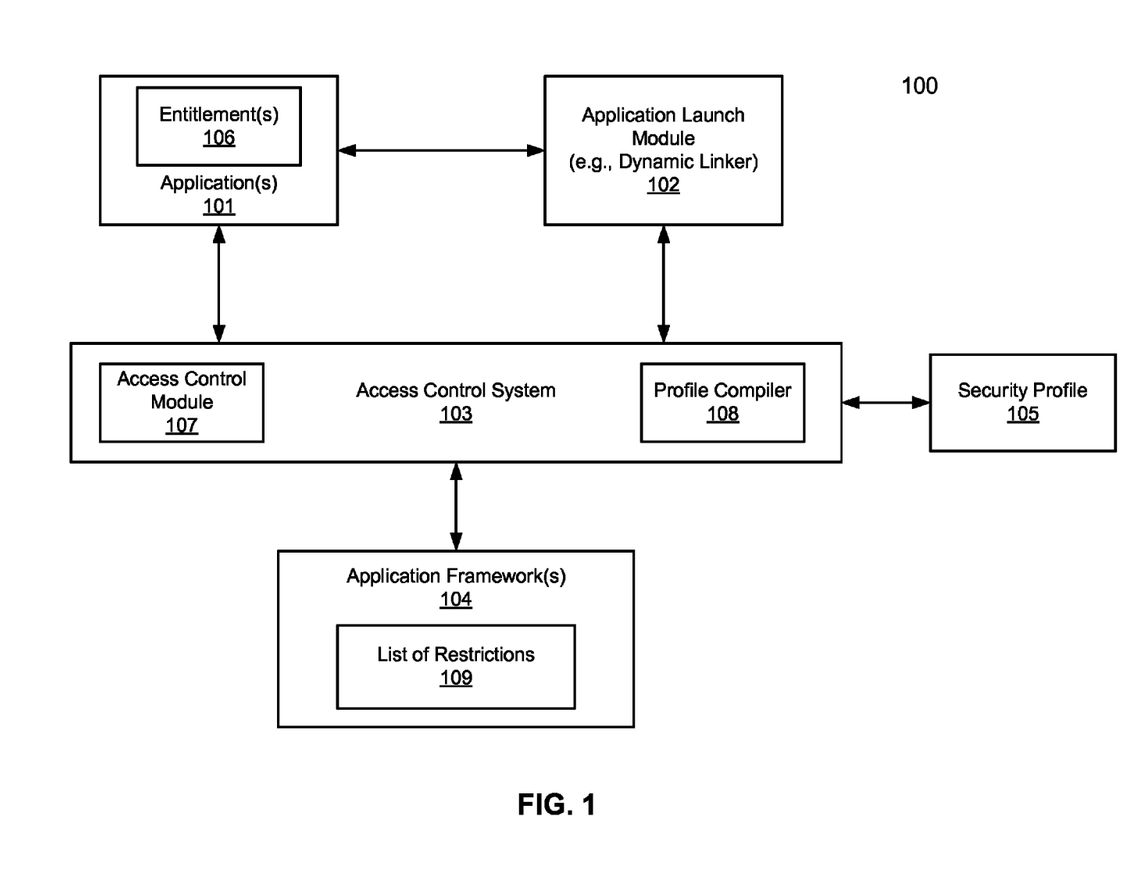
FIG. 1 is a block diagram illustrating a system for operating a program in a restricted operating environment according to one embodiment of the invention.

FIG. 1 is a block diagram illustrating a system for operating a program in a restricted operating environment according to one embodiment of the invention. System 100 may represent any computing device, such as, for example, desktops, laptops, tablets, mobile phone, digital personal assistants (PDAs), media players, gaming devices, set-top boxes, etc. In one embodiment, system 100 includes one or more applications 101 communicatively coupled to access control system 103 to access one or more application frameworks 104. Application 101 may be developed using a variety of programming languages (e.g., Java or C/C++, etc.), which may invoke one or more application frameworks 104. Each of the frameworks 104 may be in a form of one or more libraries compiled and linked with application 101 during development of application 101. For example, application frameworks 104 may include a media play framework, a user interface framework, a camera framework, etc.

System 100 further includes application launch module or launch service module 102 to launch application 101 in response to a command. Application launch module 102 may include a dynamic linker that dynamically links one or more of application frameworks 104 when application 101 is launched. According to one embodiment, when application 101 is being launched, application launch module 102 is configured to determine one or more of application frameworks 104 that application 101 is to invoke during the execution of application 101. Typically, when an application was compiled and linked during development, certain information concerning the application frameworks or libraries that the application will invoke is packaged or embedded within the application (e.g., as part of metadata or an attribute) or as part of an accessory or a list file distributed with an executable image of the application. Since a dynamic linker is the one responsible for dynamically linking the necessary libraries or application frameworks during the execution, it can determine such libraries or application frameworks to be invoked ahead of the execution.

In one embodiment, once the list of one or more application frameworks associated with application 101 has been determined, application launch module 102 invokes access control system 103 to determine a set of zero or more entitlements of application 101. The entitlements may be packaged with application 101 as part of entitlements 106, which may be implemented as part of metadata or an attribute of application 101. Entitlements 106 may be specified in plain texts or other user-recognizable forms by a developer or an authorization entity (e.g., an authorization, provisioning, or distribution facility) of application 101. Once the entitlements of application 101 have been determined, access control system 103 communicates with (e.g., via an application programming interface or API) each of application frameworks 104 that application 101 is to invoke during the execution to obtain a set of one or more rules based on the entitlements 106 of application 101. The one or more rules may be generated or emitted based on a list of restrictions 109 in view of entitlements 106 of application 101. The one or more rules represent a set of activities or resources that application 101 can or cannot do or access when accessing the respective ones of application frameworks 104 during the execution.

Based on the set of one or more rules, according to one embodiment, profile compiler 108 is configured to dynamically compile security profile 105. Security profile 105 is then stored or loaded in a secured storage location such as a kernel of an operating system (OS) that provides an operating environment of system 100. The security profile 105 can then be utilized by access control module 107 to enforce the set of one or more rules during execution of application 101, for example, restricting application 101 to operating in a restricted operating environment (e.g., sandbox).

Restricting execution of a program within a restricted operating environment can reduce the changes of the program interfering or causing damages to other components or resources of an electronic device. For example, a program may be developed by a third party and downloaded from a network. The program may include a malfunctioning component or routine (e.g., programming bugs), which may accidentally access certain critical memory space that normally exclusively utilized by an operating system, microprocessor, bus, or other components of the electronic device. Such actions may cause the electronic device to crash. Alternatively, a program may be a malicious program that is developed to intentionally cause damages to an operating environment and/or electronic device. For example, a program with virus may be specifically developed to take control of the electronic device and/or steal confidential information of a user that operates the electronic device. By restricting the execution of a program within a restricted operating environment, such damages can be greatly reduced. With embodiments described through this application, it is easier for a developer and/or an administrator to specify or configure a proper operating environment for a particular program.

Figure 2:
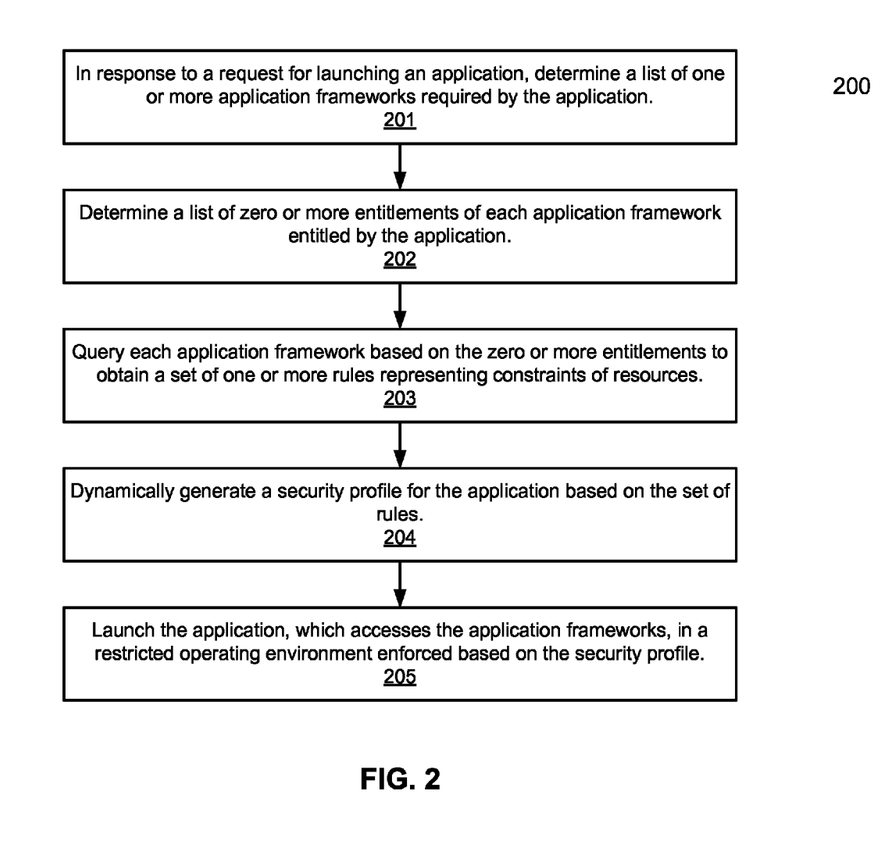
FIG. 2 is a flow diagram illustrating a method for operating a program in a restricted operating environment according to one embodiment of the invention.

FIG. 2 is a flow diagram illustrating a method for operating a program in a restricted operating environment according to one embodiment of the invention. For example, method 200 may be performed by system 100 of FIG. 1. Referring to FIG. 2, in response to a request for launching an application, at block 201, a list of one or more application frameworks required by the application is determined, for example, by an application launch module or a dynamic linker. At block 202, a list of zero or more entitlements of the application is determined, where the entitlements represent certain functions or resources which can be invoked or accessed during execution of the application. At block 203, each of the application frameworks is required by the application is queried to obtain a set of one or more rules based on the entitlements, where the one or more rules represent one or more constraints of one or more resources to be accessed by the application during execution of the application. At block 204, a security profile is dynamically generated by compiling the set of one or more rules. At block 205, the application is launched in a restricted operating environment that is enforced based on the security profile.

Figure 3:
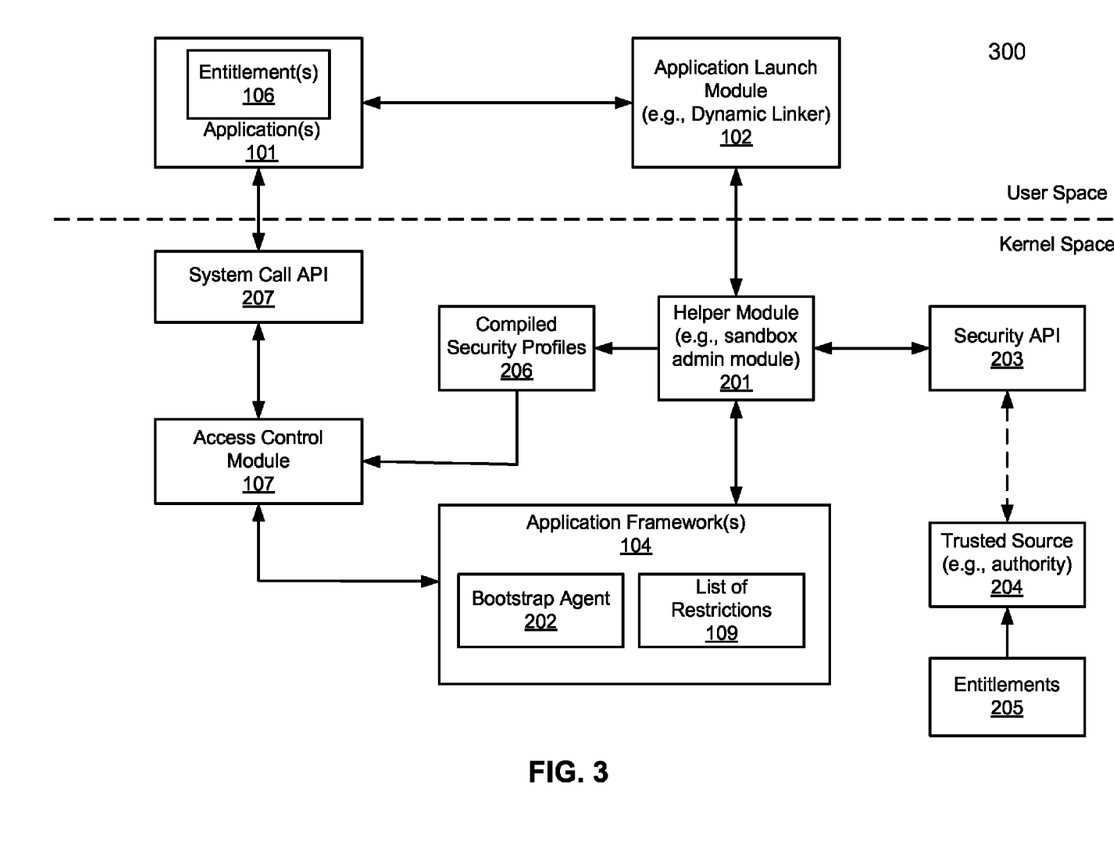
FIG. 3 is a block diagram illustrating a system for operating a program in a restricted operating environment according to another embodiment of the invention.

FIG. 3 is a block diagram illustrating a system for operating a program in a restricted operating environment according to another embodiment of the invention. Referring to FIG. 3, system 100 includes, but is not limited to, one or more applications 101 launched by application launch module 102, which may invoke or access one or more application frameworks 104. Each of the frameworks 104 may be in a form of one or more libraries compiled and linked with application 101 during development of application 101. For example, application frameworks 104 may include a media play framework, a user interface framework, a camera framework, etc. Application launch module 102 may include a dynamic linker that dynamically links one or more of application frameworks 104 when application 101 is being launched.

According to one embodiment, when application 101 is being launched, application launch module 102 is configured to determine one or more of application frameworks 104 that application 101 is to invoke during execution of application 101. The entitlements may be determined based on information generated by a compiler that compiles the source code of application 101, such as a listing file or other installation files. In one embodiment, once the list of one or more application frameworks associated with application 101 has been determined, application launch module 102 invokes a helper module 201 to determine a set of zero or more entitlements of application 101. Helper module 201 may be implemented as part of a sandbox administration module that manages restricted operating environments (e.g., sandboxes) for a variety of programs installed within system 300. The entitlements may be packaged with application 101 as part of entitlements 106, which may be implemented as part of metadata or an attribute of application 101. Entitlements 106 may be specified in plain texts or other user-recognizable forms by a developer or an authorization entity (e.g., an authorization, provisioning, or distribution facility) of application 101. For example, entitlements may be specified using user recognizable terms, such as, for example, "network inbound," "network outbound," "unmediated file read/write," "microphone-access," "camera-access," etc.

In one embodiment, helper module 201 is configured to scan and extract entitlements 106 from application 101. In one embodiment, entitlements 106 may be signed by an authority entity that distributed or provisioned application 101 using a chain of digital certificates (e.g., x.509 compatible digital certificates). Entitlements 106 may be authenticated by helper module 201 using a root certificate of the certificate chain, where the root of certificate may be stored in a secure storage location such as a secure read-only memory (ROM) of system 300 (not shown).

In one embodiment, helper module 201 communicates with trusted source 204 via secure API 203 to retrieve a set of zero or more entitlements 205, which may be obtained from entitlements 106 of application 101 by trusted source 204. Trusted source 204 may be a trusted system component such as a secure kernel module running within a kernel of an operating system within system 300. Alternatively, trusted source 204 may be remotely located trusted source such as an authorization entity that has provisioned or distributed application 101 and maintained the entitlements of application 101.

Once the entitlements of application 101 have been determined, according to one embodiment, helper module 201 communicates with each of application frameworks 104 that application 101 is to invoke during the execution to obtain a set of one or more rules based on the entitlements 106 of application 101. The one or more rules may be generated or emitted based on a list of restrictions 109 in view of entitlements 106 of application 101. The one or more rules represent a set of activities or resources that application 101 can or cannot do or access when accessing the respective application frameworks 104 during the execution. In a particular embodiment, helper module 201 invokes bootstrap agent 202 of each of application frameworks 104 to retrieve a set of one or more rules based on list of restrictions in view of the entitlements of application 101.

In one embodiment, helper module 201 scans (e.g., "walks through") the list of application frameworks 104 required by application 101 by invoking (e.g., executing) the respective bootstrap agents to obtain a set of rules for each application framework and to combine the sets of rules from all application frameworks associated with application 101 to generate a final set of rules. When calling a bootstrap agent, helper module 201 passes a list of zero or more entitlements as one or more parameters and based on the zero or more entitlements, the respective bootstrap agent emits a set of one or more rules that governs the access of resources associated with the application framework. As a result, although application 101 is compiled and/or linked with a particular application framework or library, only the functions or resources of the application framework or library that are entitled by application 101 can be accessed. Other functions or resources that are not entitled by application 101 would not be accessed by application 101 during the execution.

Note that an application framework or library may contain or be associated with more functions or resources than necessary for a given application. By limiting the access of an application to the functions or resources of an application framework, the chances of compromising integrity of the application framework can be reduced. Also note that bootstrap agent 202 can be optional. According to one embodiment, application framework 104 may statically maintain the list of restrictions 109. Helper module 201 may retrieve the list of restrictions 109, interpret or invoke an interpreter to interpret the restrictions in view of the entitlements of application 101, and generate a set of one or more rules for application 101.

Based on the set of one or more rules, according to one embodiment, helper module 201 is configured to compile or invoke a profile compiler to compile a security profile for application 101. A security profile can include one or more policies, where a policy is a logical expression of a permissive or restrictive action that a sandboxed process may or may not take. For example, one policy may expressly allow a mail application to access an email database. In such an example, all other actions may be implicitly denied. In some situations, a default policy is available in a security profile, such that if none of the expressed permissive policies are applicable, then the default policy (typically denial of the operation) is applied.

Referring back to FIG. 3, once the security profile has been compiled, helper module 201 returns the security profile back to application launch module 102, which in turn hands the security profile to the kernel of the operating system. The security profile is then stored or loaded in a secured storage location as part of security profiles 206. Alternatively, the security profile generated by helper module 201 can be directly transmitted to the kernel to be stored as part of security profiles 206. The security profiles 206 can then be utilized by access control module 107 to enforce the set of one or more rules during the execution when application 101 accesses application frameworks 104 via system API 207, which restricts application 101 in a restricted operating environment (e.g., sandbox). An application executed within a restricted environment or sandbox is referred to as a sandboxed process.

A sandboxed process refers to a process that has been restricted within a restricted operating environment (e.g., sandbox) that limits the process to a set of predefined resources. Each sandboxed process may be associated with a set of dedicated system resources, such as, for example, a dedicated memory space, a dedicated storage area, or a virtual machine, etc. One of the purposes of sandboxing an application is to isolate the application from accessing other unnecessary or unrelated system resources of another application or a system component, such that any damage caused by the application would not spill over to other areas of system 100.

To provide security, an application may be "contained" by restricting its functionality to a subset of operations and only allowing operations that are necessary for the proper operation, i.e., operation according to its intended functionality. One method to implement a limited set of policies for each application is to contain, or "sandbox" the application. Sandboxing of an application or process can be achieved using operating system level protection to provide containment and to enforce security policies, such as policies that restrict the ability of the application to take actions beyond those functions needed for it to provide its intended functionalities.

When an application has been sandboxed during execution, the application is executed as a sandboxed process or thread within the system that is contained within a sandbox (also referred to as an application container), in which it cannot access certain system resources or another territory (e.g., sandbox) of another application, subject to a security profile associated with the sandboxed application, which is referred to as a sandboxed process or a sandboxed application.

A sandboxed process is the application or other program for which security containment will be implemented. In many cases, a sandboxed process is a user application, but it could be another program implemented on the computing device such as a daemon or a service. To increase security and provide an efficient mechanism, portions of the security system are implemented or executed in a kernel space. In addition, a monitor process module (not shown) is executed in a separate memory space from the sandboxed processes to further insulate them from each other. In particular, a sandboxed process is restricted from accessing memory outside of its process space and is further prohibited from spawning a non-sandboxed process. For example, a security profile of a sandboxed process may include a rule or policy that denies the sandboxed process from using certain system calls, which may be a mechanism that allows processes to alter each other's address spaces.

In some embodiments a policy may prevent a program from performing certain actions based on the state of an external accessory connected to the computing device, e.g. if an accessory of a specific type or identity is connected; is disconnected, or is connected and is in (or is not in) a specific mode. For example, an application may only be allowed to communicate over an externally accessible data bus if an accessory that meets certain criteria is connected to the data bus and is in a receptive mode. Further detailed information concerning sandboxing techniques can be found in co-pending U.S. patent application Ser. No. 11/462,680, filed Aug. 4, 2006, which has been assigned to a common assignee of the present application and is incorporated by reference herein in its entirety.

Figure 4:
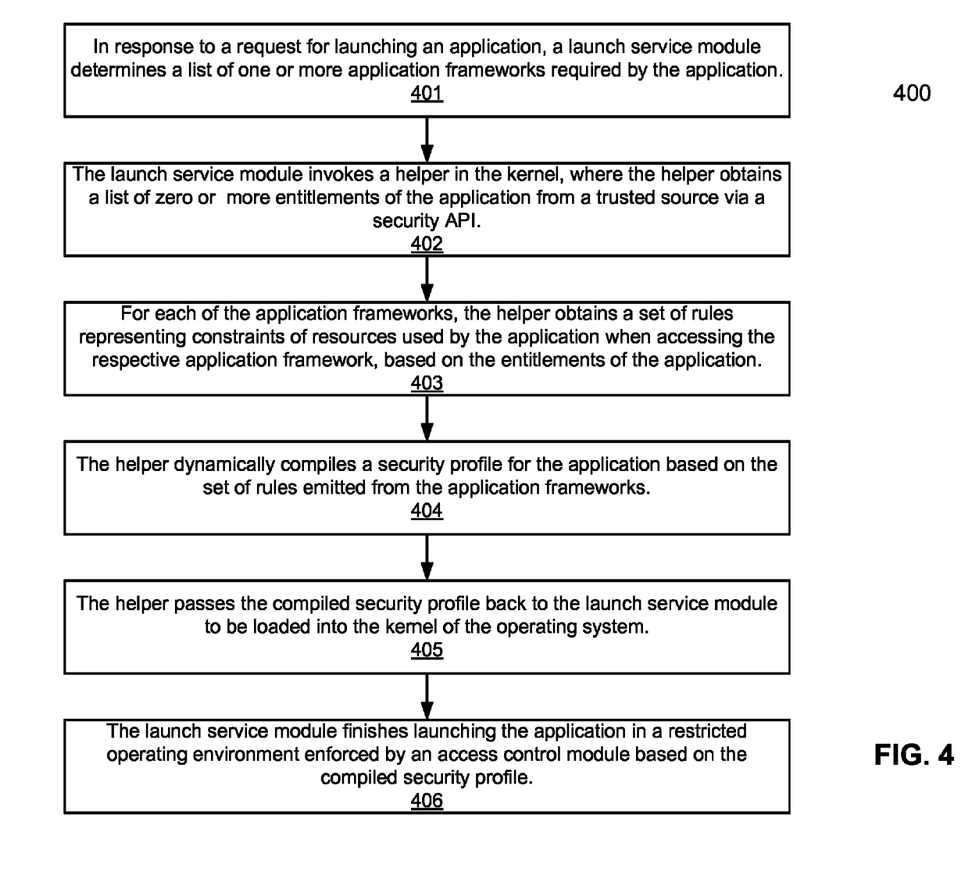
FIG. 4 is a flow diagram illustrating a method for restricting an application in a restricted operating environment according to another embodiment of the invention.

FIG. 4 is a flow diagram illustrating a method for restricting an application in a restricted operating environment according to another embodiment of the invention. For example, method 400 may be performed by system 300 of FIG. 3. Referring to FIG. 4, at block 401, in response to a request for launching an application, a launch service module determines a list of one or more application frameworks required by the application during execution. At block 402, the launch service module invokes a helper in the kernel of an operating system, where the helper obtains a list of zero or more entitlements of the application from a trusted source via a security API. At block 403, for each of the application frameworks required by the application, the helper communicates with the application framework to obtain a set of one or more rules based on the entitlements. The set of rules represent one or more constraints of resources used by the application when accessing the respective application framework. At block 404, the helper dynamically compiles or invokes a profile compiler to compile a security profile for the application based on the set of one or more rules provided from each application framework. At block 405, the helper returns the compiled security profile to the launch service module to be loaded into the kernel of the operating system. At block 406, the launch service continues launching the application in a restricted operating environment that is enforced by an access control module based on the security profile.

Figure 5:
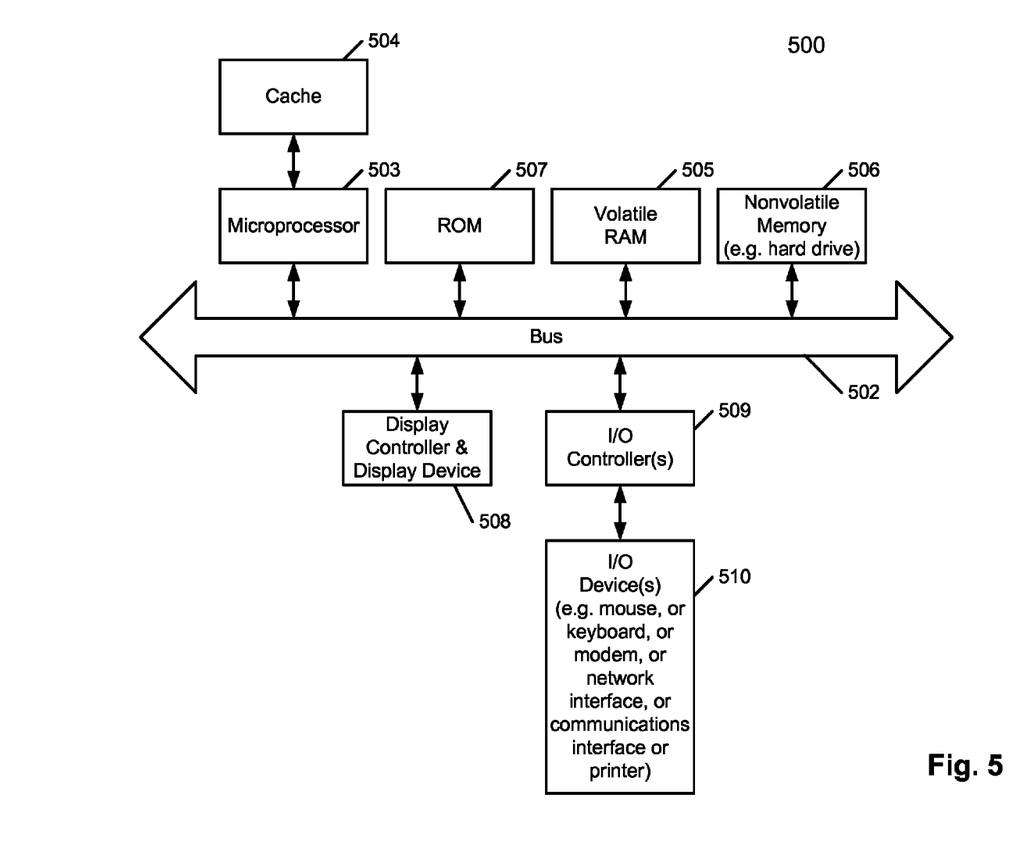
FIG. 5 is a block diagram of a data processing system, which may be used with one embodiment of the invention.

FIG. 5 is a block diagram of a data processing system, which may be used with one embodiment of the invention. For example, the system 500 may be used as system 100 of FIG. 1 or system 300 of FIG. 3. Note that while FIG. 5 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention. The computer system of FIG. 5 may, for example, be an Apple Macintosh computer or MacBook, or an IBM compatible PC.

As shown in FIG. 5, the computer system 500, which is a form of a data processing system, includes a bus or interconnect 502 which is coupled to one or more microprocessors 503 and a ROM 507, a volatile RAM 505, and a non-volatile memory 506. The microprocessor 503 is coupled to cache memory 504. The bus 502 interconnects these various components together and also interconnects these components 503, 507, 505, and 506 to a display controller and display device 508, as well as to input/output (I/O) devices 510, which may be mice, keyboards, modems, network interfaces, printers, and other devices which are well-known in the art.

Typically, the input/output devices 510 are coupled to the system through input/output controllers 509. The volatile RAM 505 is typically implemented as dynamic RAM (DRAM) which requires power continuously in order to refresh or maintain the data in the memory. The non-volatile memory 506 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 5 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 502 may include one or more buses connected to each other through various bridges, controllers, and/or adapters, as is well-known in the art. In one embodiment, the I/O controller 509 includes a USB (Universal Serial Bus) adapter for controlling USB peripherals. Alternatively, I/O controller 509 may include an IEEE-1394 adapter, also known as FireWire adapter, for controlling FireWire devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for dynamically compiling a security profile for a program, the method comprising:
   in response to a request for launching a program, determining, by a launch module executed by a processor, a list of one or more application frameworks to be accessed by the program during execution of the program;
   determining, by a helper module executed by the processor, zero or more entitlements representing one or more resources entitled by the program during the execution;
   determining a set of one or more rules associated with at least one of the application frameworks based on the entitlements of the program, the set of one or more rules specifying one or more of resources associated with the at least one application framework, the at least one application framework providing an operating environment for the program; and
   dynamically compiling, by a profile compiler, a security profile for the program based on the set of one or more rules associated with the at least one application framework, wherein the compiled security profile is used to restrict the program from accessing at least one resource of the at least one application frameworks during the execution of the program.

2. The method of claim 1, further comprising:
   loading the compiled security profile of the program in a kernel space of an operating system (OS) of a data processing system;
   launching the program in a user space of the OS of the data processing system; and
   in response to a request received from the program to access a first of the application frameworks, enforcing within the kernel space a set of one or more rules based on the loaded security profile to limit resources of the first application framework accessed by the program.

3. The method of claim 1, wherein determining zero or more entitlements comprises communicating with a trusted source to obtain a list of the entitlements of the program, wherein the trusted source maintains entitlements of a plurality 1 of programs to be deployed in a data processing system.

4. The method of claim 3, wherein the trusted source is associated with an authority that authorizes at least a portion of the plurality of programs to be deployed in the data processing system.

5. The method of claim 1, wherein determining zero or more entitlements comprises extracting information representing the entitlements from the program.

6. The method of claim 5, wherein the information representing the entitlements is stored in an attribute of the program signed by a trusted source that authorizes the program to be deployed in the data processing system.

7. The method of claim 1, wherein obtaining a set of one or more rules based on the entitlements comprises:
   identifying a bootstrap snippet associated with each of the application frameworks; and
   executing the identified bootstrap snippet to generate the set of one or more rules associated with each application framework based on the entitlements of the program.

8. The method of claim 1, wherein obtaining a set of one or more rules based on the entitlements comprises:
   retrieving from each application framework a list of restrictions concerning resources associated with the application framework; and
   interpreting the restrictions in view of the entitlements of the program to generate the set of one or more rules.

9. A non-transitory computer-readable storage medium having instructions stored therein, which when executed by a computer, cause the computer to perform a method for dynamically compiling a security profile for a program, the method comprising:
   in response to a request for launching a program, determining by a launch module executed by a processor, a list of one or more application frameworks to be accessed by the program during execution of the program;
   determining zero or more entitlements representing one or more resources entitled by the program during the execution;
   determining by a helper module a set of one or more rules associated with at least one of the application frameworks based on the entitlements of the program, the set of one or more rules specifying one or more resources associated with the at least one application framework, the at least one application framework providing an operating environment for the program; and
   dynamically compiling, by a profile compiler, a security profile for the program based on the set
      of one or more rules associated with the at least one application framework, wherein the compiled security profile is used to restrict the program from accessing at least one resource of the at least one application frameworks during the execution of the program.

10. The non-transitory computer-readable storage medium of claim 9, wherein the method further comprises:
    loading the compiled security profile of the program in a kernel space of an operating system (OS) of a data processing system;
    launching the program in a user space of the OS of the data processing system; and
    in response to a request received from the program to access a first of the application frameworks, enforcing within the kernel space a set of one or more rules based on the loaded security profile to limit resources of the first application framework accessed by the program.

11. The non-transitory computer-readable storage medium of claim 9, wherein determining zero or more entitlements comprises communicating with a trusted source to obtain a list of the entitlements of the program, wherein the trusted source maintains entitlements of a plurality of programs to be deployed in a data processing system.

12. The non-transitory computer-readable storage medium of claim 11, wherein the trusted source is associated with an authority that authorizes at least a portion of the plurality of programs to be deployed in the data processing system.

13. The non-transitory computer-readable storage medium of claim 9, wherein determining zero or more entitlements comprises extracting information representing the entitlements from the program.

14. The non-transitory computer-readable storage medium of claim 13, wherein the information representing the entitlements is stored in an attribute of the program signed by a trusted source that authorizes the program to be deployed in the data processing system.

15. The non-transitory computer-readable storage medium of claim 9, wherein obtaining a set of one or more rules based on the entitlements comprises:
    identifying a bootstrap snippet associated with each of the application frameworks; and
    executing the identified bootstrap snippet to generate the set of one or more rules associated with each application framework based on the entitlements of the program.

16. The non-transitory computer-readable storage medium of claim 9, wherein obtaining a set of one or more rules based on the entitlements comprises:
    retrieving from each application framework a list of restrictions concerning resources associated with the application framework; and
    interpreting the restrictions in view of the entitlements of the program to generate the set of one or more rules.

17. An apparatus, comprising:
    a processor; and
    a memory coupled to the processor;
    a launch service module executed in the memory by the processor, in response to a request for launching a program, to determine a list of one or more application frameworks to be accessed by the program during execution of the program;
    a helper module executed in the memory by the processor and coupled to the launch service module to determine zero or more entitlements representing one or more resources entitled by the program during the execution;
    one or more application frameworks executed in the memory by the processor to provide a set of one or more rules based on the entitlements of the program, the set of one or more rules specifying one or more resources associated with at least one of the application frameworks; and
    a profile compiler executed in the memory by the processor to dynamically compile a security profile for the program based on the set of one or more rules associated with the at least one application framework, wherein the compiled security profile is used to restrict the program from accessing at least one resource of the at least one application framework during the execution of the program.

18. The apparatus of claim 17, further comprising an access control module, in response to a request received from the program to access a first of the application frameworks, to enforce within a set of one or more rules based on the security profile to limit resources of the first application framework accessed by the program.

* * * * *